United States Patent
Dultz et al.

(10) Patent No.: US 6,975,800 B2
(45) Date of Patent: Dec. 13, 2005

(54) FUSED SILICA-BASED OPTICAL WAVEGUIDE AND METHOD FOR ITS MANUFACTURE

(75) Inventors: Wolfgang Dultz, Frankfurt/M (DE); Walter Heitmann, Gross-Bieberau (DE); Karl-Friedrich Klein, Friedberg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/312,113

(22) PCT Filed: May 31, 2001

(86) PCT No.: PCT/EP01/06172

§ 371 (c)(1),
(2), (4) Date: Apr. 24, 2003

(87) PCT Pub. No.: WO01/98804

PCT Pub. Date: Dec. 27, 2001

(65) Prior Publication Data

US 2003/0165312 A1 Sep. 4, 2003

(30) Foreign Application Priority Data

Jun. 20, 2000 (DE) ......................... 100 30 264

(51) Int. Cl.[7] ................................. G02B 6/02
(52) U.S. Cl. ...................... 385/123; 385/141; 65/397; 65/435
(58) Field of Search ................. 385/123, 124, 385/129–132, 141–145; 65/397, 398, 435, 481, 475, 477

(56) References Cited

U.S. PATENT DOCUMENTS

| 4,634,218 A | * | 1/1987 | Hicks, Jr. .................. 385/123 |
| 4,664,473 A | * | 5/1987 | Gannon ..................... 385/126 |
| 4,802,733 A | | 2/1989 | Wilson et al. |
| 5,483,613 A | | 1/1996 | Bruce et al. |
| 6,307,994 B1 | * | 10/2001 | Paek et al. ................. 385/127 |
| 6,418,757 B1 | * | 7/2002 | Berkey et al. ............... 65/430 |
| 6,530,244 B1 | * | 3/2003 | Oh et al. ................... 65/417 |

FOREIGN PATENT DOCUMENTS

| DE | 29 39 339 | 8/1987 | |
| DE | 37 20 028 | 12/1988 | |
| DE | 38 20 217 | 12/1989 | |
| DE | 39 36 006 | 5/1991 | |
| DE | 40 34 059 | 5/1992 | |
| DE | 197 49 312 | 5/1999 | |
| EP | 03 22 744 | 7/1989 | |
| JP | 02229733 A | * 9/1990 | ......... C03B/37/027 |
| WO | WO 98/01776 | 1/1998 | |

OTHER PUBLICATIONS

Patent Abstracts of Japan, vol. 014, Aug. 7, 1990, of JP02–133333, Fujikara Ltd., May 22, 1990 (Abstract).

(Continued)

*Primary Examiner*—Juliana Kang
(74) *Attorney, Agent, or Firm*—Kenyon & Kenyon

(57) ABSTRACT

The invention relates to an optical waveguide (optical fiber) based on quartz glass having reduced internal mechanical stresses. In prior art optical waveguides, the internal mechanical stresses are primarily due to the production process, namely due to the difference of the linear thermal coefficients of expansion of the core and sheathing material during the cooling of the fiber and due to the drawing itself. In an inventive optical waveguide, the difference of the linear thermal coefficients of expansion of the core and/or sheathing material is selected by means of an appropriate doping of the core and sheathing material. This selection is made so that the internal mechanical stresses, which are caused by the cooling during the production process, are significantly reduced or eliminated and/or they counteract the stresses caused by the drawing. The invention provides that all of tile internal stresses inside the optical waveguide are significantly reduced, minimized or eliminated with regard to those of prior art optical waveguides. The advantageous effects resulting therefrom include a lower attenuation and improved PMD values compared to prior art optical waveguides.

4 Claims, 1 Drawing Sheet

OTHER PUBLICATIONS

Figure 1:
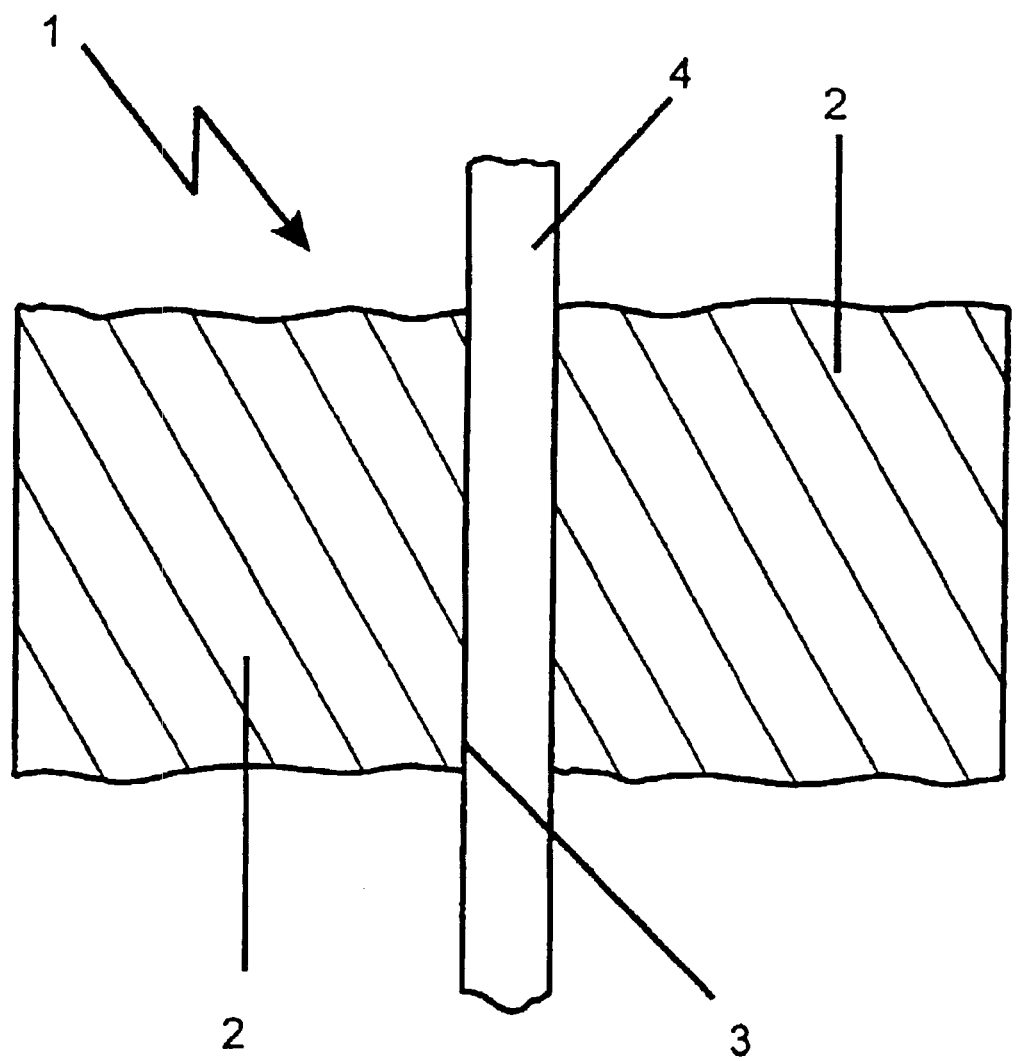

Bauch et al., "Fibers with Pure $SiO_2$–Core Mady by PICVD," J. Opt. Commun., 8, 1987, 4, pp. 136–139.

Electronics Letters, Aug. 1, 1991, vol. 27, No. 16, pp. 1432–1433.

Lydtin, H., "Moeglichkeiten und Grezen des PCVD—Verfahrens zur Herstellung von Lichleitfasern," Fördervorhaben des BMFT, Kennzeichen, 412–7491–TK0255/9, Berichtszeitraum, Jan. 1984–Dec. 1986.

Tateda et al, Design of Viscosity–Matched Optical Fibers, Sep. 1992, IEEE Photonics Technology Letters, vol. 4, No. 9, pp. 1023–1025.*

* cited by examiner

FUSED SILICA-BASED OPTICAL WAVEGUIDE AND METHOD FOR ITS MANUFACTURE

FIELD OF THE INVENTION

The present invention is directed to a fused silica-based optical waveguide (optical fiber), the core and/or the cladding of the optical waveguide being doped with one or more foreign substances, and to a method for manufacturing the optical waveguide.

BACKGROUND OF THE INVENTION

Fused silica-based optical waveguides (optical fibers) are being used on a large scale today in optical transmission networks. The most important fiber type is the single-mode fiber (monomode fiber) having a core diameter of typically about 8 through 9 μm and a cladding diameter of typically about 125 μm. Single-mode fibers are distinguished by low attenuation and dispersion, i.e., these fibers are able to transmit information and data with negligible losses and large bandwidths.

In the transmission of information using optical waveguides, a reduction in the attenuation is associated with a reduction in the transmission losses and with a gain in usable bandwidth and, therefore, with considerable economic advantages, particularly when optical long-distance networks or undersea cables are involved.

In known methods heretofore, the lowest attenuation was attained when working with single-mode fibers having a pure (i.e., undoped) fused silica core and a fused silica cladding doped with fluorine. The firm Sumitomo, Japan supplies fibers of this type, which in the wavelength range of 1.55 to 1.58 μm exhibit a minimal attenuation coefficient of 0.17 dB/km.

In 1986, the firm Sumitomo manufactured a fiber having a damping coefficient of 0.154 dB/km at a wavelength of 1.55 μm. Till today, however, one has not been able to reproduce this value. Details pertaining thereto have been published by H. Kanamori et al. in "Transmission Characteristics and Reliability of Pure-Silica-Core Single-Mode Fibers", Journal of Lightwave Technology, vol. LT-4, no. 8, August 1986, pp. 1144 –1150.

Theoretical considerations and calculations by M. E. Lines et al., published in "Calcium Aluminate Glasses as Potential Ultralow-Loss Optical Materials", Journal of Non-Crystalline Solids 107 (1989), pp. 251–260, established a value of 0.145 dB/km as a minimal attenuation coefficient for pure fused silica.

Based on this agreement between theory and practice, it is generally accepted in the related art that a reduction in the attenuation of single-mode fibers to values substantially below 0.15 dB/km is not possible.

However, a review of the data provided in the last-mentioned publication revealed that an attenuation coefficient of 9.2 dB/km was measured at a wavelength of 0.514 μm on solid fused silica. When this value is converted to the attenuation coefficient at 1.55 μm, a value is derived which lies substantially below 0.15 dB/km.

In close agreement with this are earlier calculations by M. E. Lines, published in "Scattering Losses in Optic Fiber Materials: II Numerical Estimates", Journal of Applied Physics, vol. 55, no. 11, June 1984, pp. 4058–4063, in which a value of only 0.10 dB/km was ascertained for the minimal attenuation coefficient of pure fused silica at a wavelength of 1.55 μm.

The two last-mentioned results suggest that the attainable, lower physical limit of the attenuation (intrinsic limit) is substantially below 0.15 dB/km.

This is confirmed by a measured value on a multimode step-index fiber having a pure fused-silica core and an F-doped cladding. In accordance with a measurement by H. Bauch and V. Paquet published in "Fibers With Pure $SiO_2$-Core Made by PICVD", Journal of Optical Communications 8 (1987) 4, pp. 136–139, an attenuation coefficient of 9.4 dB/km was found, namely, at a wavelength of 0.5 μm.

Converted to a wavelength of 1.55 μm and with the addition of an absorption loss of 0.02 dB/km (taken from the publication already cited above by M. E. Lines et al. in "Calcium Aluminate Glasses as Potential Ultralow-Loss Optical Materials", Journal of Non-Crystalline Solids 107 (1989), pp. 251–260), from the H. Bauch and V. Paquet result, an attenuation coefficient of 0.11 dB/km is derived.

In this estimation, additional losses caused, for example, by the higher modes are not considered.

These values are clearly inconsistent with the minimal value of approx. 0.15 dB/k accepted in the related art. Thus, one can assume that, at a wavelength of 1.55 μm, the physically possible lower limit of the attenuation coefficient of single-mode fibers having a pure fused silica core does not lie in the range of 0.15 dB/km, as assumed in the related art, but rather in the range between 0.10–0.11 dB/km and, thus, substantially below 0.15 dB/km.

A reason why the minimal value of 0.154 dB/km attained at a wavelength of 1.55 μm in practice, in known methods heretofore, was, nevertheless, not able to be undercut, is mainly the inner mechanical stresses, which arise within the fibers during manufacturing, particularly at the core-cladding boundary surface.

For that reason, the manufacturing process of commercial optical waveguides is briefly explained in the following.

The functional principle of optical waveguides provides for the core material to have a higher refractive index than the cladding material. This difference in the refractive indices is usually achieved by a germanium dioxide ($GeO_2$) doping of the core material or by a fluorine doping of the cladding material. Associated at the same time, however, with a conventional doping as provided in the related art, is a change in the linear, thermal expansion coefficient.

For that reason, the core material and cladding material exhibit different linear, thermal expansion coefficients, heavily influenced by the doping. In the case of single-mode fibers having a pure fused silica core, the fluorine doping of the cladding is usually chosen in such a way that the refractive index is reduced as compared to the undoped fused silica by about 0.4%. The expansion coefficient of the undoped core is approx. 5 . . . $6*10^{-7}/°$ C.; for the doped cladding, approximately $3.10^{-7}/°$ C. is derived, as can be inferred from the publication "Möglichkeiten und Grenzen des PCVD-Verfahrens zur Herstellung von Lichtleitfasern" [Possibilities and Limits of the PCVD Method for Manufacturing Optical Waveguides] (final report), Delivery Plans of the BMFT, reference 412-7491-TK0255/9, report time period 1/84-12/86, by H. Lydtin et al.

During manufacturing of the optical waveguide, the melt is heated to about 2000° C. in the drawing bulb at the end of the preform to draw out the fiber. By the time it is coiled around the drawing drum, the fiber has then cooled to ambient temperature, i.e., the optical waveguide is subjected to intense cooling during its manufacturing process.

At about 1000° C., the core and cladding material become so viscous that the stresses produced by the different expansion coefficients of the cladding and core are no longer able to be equalized or reduced. As a result, a steep stress gradient forms in the core/cladding boundary region in response to further cooling in the interior of the optical waveguide.

Accordingly, one important reason the mechanical stresses form inside the optical waveguide is the cooling that takes place during the course of its manufacturing.

Another source of the mechanical stresses within the optical waveguide is the drawing process that the optical waveguide is subject to during its manufacturing. The amounts of the mechanical stresses caused by this within the optical waveguide can be on the order of those formed due to the cooling.

According to investigations by G. R. Atkins et al., published in "Defects in Optical Fibres in Regions of High Stress Gradients", Electronics Letters vol. 27, no. 16 (1991), pp. 1432–1433, these stresses can become so great that bonds are broken between the atoms in the glass network.

Due to these stresses, inhomogeneities, refractive index gradients and scattering centers form, for example, within the optical waveguide and thereby increase the attenuation coefficient. Measurements of stresses in blank wafers have revealed that, in the case of single-mode fibers, the region of the steep stress gradients amounts to about 60% of the core cross-section. A substantial portion of the optical power transported by the single-mode fiber flows in this region, which is disposed more or less symmetrically with respect to the core/cladding boundary surface. This means that the mechanical stresses within the single-mode fibers can adversely affect the integral attenuation to a considerable degree.

In addition, besides increasing attenuation, mechanical stresses within the optical waveguide also cause a double refraction and, thus, an increase in the polarization mode dispersion (PMD). However, at high bit rates, elevated PMD values disadvantageously lead to a reduction in the transmission bandwidth.

The object of the present invention is, therefore, to provide an optical waveguide having reduced inner mechanical stresses.

This objective is achieved in accordance with the present invention by an optical waveguide having a core and a cladding, each of fused silica, in that the difference between the linear thermal expansion coefficients of the core and cladding material is selected by doping the core and/or cladding material using at least one foreign substance to the effect that the inner mechanical stresses produced in optical waveguide (1) by the manufacturing process are reduced.

A method for manufacturing an optical waveguide having a core and a cladding, each of fused silica, where a fiber is cooled and drawn from a melt, is distinguished by the difference between the linear thermal expansion coefficients of the core and cladding material being selected by doping the core and/or cladding material using at least one foreign substance to the effect that the inner mechanical stresses produced in the optical waveguide (1) by the cooling and/or drawing and/or other stresses produced by the manufacturing process are reduced.

In accordance with the present invention, the cladding material or the core material or both the cladding as well as the core material may be suitably doped. As already explained above, a doping operation influences the refractive index as well as the linear thermal expansion coefficient of fused silica at the same time. In accordance with the present invention, by properly doping the core and/or cladding material, both the difference between the refractive indices, as well as the difference between the linear thermal expansion coefficients of the core and/or cladding material are selectively brought to specific values.

Difference in Refractive Index:

In accordance with the present invention, on the one hand, either the core material or the cladding material, or both are doped in such a way with one or more suitable foreign substances in such a way that the refractive index of the core material is higher by the desired amount that that of the cladding material. In particular, one may advantageously select the doping of the core and/or of the cladding material in dependence upon the type of optical waveguide in such a way that the difference in the refractive index between the core and cladding material is not changed compared to a conventional optical waveguide of the same type.

Therefore, when the optical waveguide is a standard single-mode fiber, the doping of the core and/or of the cladding material may be selected in particular in such a way that the refractive index of the cladding material, in the same way as in the case of standard, commercial single-mode fibers, is 0.2% to 0.6%, preferably 0.4% less than that of the core material. When, for example, the optical waveguide is a dispersion-shifted single-mode fiber, the doping of the core and/or of the cladding material may be selected in such a way that the refractive index of the cladding material, in the same way as in the case of traditional dispersion-shifted single-mode fibers, is 0.8% to 1.6%, preferably 1% less than that of the core material.

When, for example, the optical waveguide is a step-index multimode fiber, the doping of the core and/or of the cladding material may be selected in such a way that the refractive index of the cladding material, in the same way as in the case of traditional step-index multimode fibers, is 0.5% to 2.5%, preferably 1.0% less than that of the core material.

Difference Between the Linear, Thermal Expansion Coefficients:

On the other hand, in accordance with the present invention, by doping the cladding and/or core material, the linear thermal expansion coefficients of the cladding and/or core material and, thus, in particular also the difference between them are furthermore selectively influenced in such a way that that the mechanical stresses produced by the manufacturing process within the optical waveguide are reduced.

In another specific embodiment of the present invention, the doping of the core and/or of the cladding is selected in such a way that the difference between the linear thermal expansion coefficients of the cladding and the core is diminished. In this case, the mechanical stresses formed inside the optical waveguide in response to the cooling associated with the manufacturing of the optical waveguide, are reduced.

In one preferred specific embodiment of the present invention, the doping of the core and/or of the cladding is selected so as to effect equivalent linear thermal expansion coefficients of the cladding and of the core. In other words, the difference between them disappears. In this case, no mechanical stresses or only very slight mechanical stresses arise in the optical waveguide during the cooling operation associated with its manufacture. However, the stresses caused by the drawing process associated with the manufacturing are not reduced in this specific embodiment of the present invention. The resulting total stresses within the optical waveguide are reduced, however, in accordance with the present invention.

In another specific embodiment of the present invention, the doping of the core and/or of the cladding are, therefore, selected in such a way that the difference between the linear thermal expansion coefficients of the cladding and core does not disappear, but rather assumes such a value in a selective fashion that those mechanical stresses within the optical waveguide which are caused during its manufacturing by the cooling associated therewith, thus thermally caused, counteract those mechanical stresses within the optical waveguide which are created by the drawing process during its manufacturing. Thus, in this specific embodiment of the present invention, the resultant total mechanical stresses within the optical waveguide are further reduced.

In another preferred specific embodiment of the present invention, the difference between the linear thermal expansion coefficients of the cladding and the core are selected by properly doping the core and/or the cladding in such a way that the mechanical stresses thermally induced within the optical waveguide (by the cooling during manufacturing) and those induced by the drawing process cancel one another or are minimized. Altogether, therefore, in this specific embodiment of the present invention, the mechanical stresses within the optical waveguide that originated during the manufacturing process are advantageously cancelled or minimized.

The method according to the present invention for reducing, minimizing or canceling the inner mechanical stresses may also be applied to fibers having other refractive-index differences, such as to multimode step-index fibers or to dispersion-shifted, single-mode fibers having a typical refractive-index difference of 1%.

The low attenuation of an optical waveguide in accordance with the present invention also leads to a marked decline in the attenuation coefficient within the wavelength range of around 1.3 μm mainly used in known methods heretofore in optical networks. At a wavelength of 1.3 μm, high-grade single-mode fibers produced till now exhibit an attenuation coefficient of about 0.34 dB/km. When an optical waveguide according to the present invention is used, this value may be reduced to about half.

The development of optical information and communication technology is characterized by a constantly growing need for transmission bandwidth. In optical networks, a plurality of wavelengths are increasingly being used in parallel with the transmission. This technique is described as WDM (wavelength division multiplexing) or as DWDM (dense WDM). For the maximally transmittable bandwidth, the available spectral region having low attenuation is an important criterion. Using an optical waveguide according to the present invention in a single-mode design, given an OH-supplemental absorption of less than 0.1 dB/km between 1.25 μm and 1.65 μm, a 400 nm broad wavelength range is able to be implemented in which the attenuation coefficient is less than 0.3 dB/km. Thus, at a distance between the individual transmission channels of 0.4 nm (DWDM), 1000 wavelengths are able to be simultaneously transmitted with very low losses.

Due to the reduced internal mechanical stresses, a single-mode fiber in accordance with the present invention is also superior with respect to the PMD values of conventional single-mode fibers.

In one specific embodiment of the present invention, the core and/or cladding material is/are doped using at least one first and one second foreign substance in such a way that the ratio of the change in the refractive index to the change in the linear thermal expansion coefficient produced by a doping using the first foreign substance is different from the ratio of the change in the refractive index to the change in the linear thermal expansion coefficient produced by a doping using the second foreign substance.

In another refinement of this specific embodiment, the core and/or cladding material is/are doped using at least one first and one second foreign substance in such a way that the change in the refractive index caused by a doping using the first foreign substance is in the opposite direction from the change in the refractive index caused by a doping using the second foreign substance.

In another refinement of this specific embodiment, the core and/or cladding material is/are doped using at least one first and one second foreign substance in such a way that the change in the linear thermal expansion coefficient by a doping using the first foreign substance is in the opposite direction from the change in the linear thermal expansion coefficient caused by a doping using the second foreign substance.

In one preferred specific embodiment of the present invention, the foreign substances for doping the core and/or cladding are fluorine (F) and germanium dioxide ($GeO_2$). The mode of action of such a double doping is clarified in the following.

In the case of a fluorine doping, both the refractive index, as well as the linear thermal expansion coefficient are reduced, each of these reductions being in a specific numerical ratio of $X_1$.

On the other hand, in the case of a germanium dioxide doping, both the refractive index, as well as the linear thermal expansion coefficient increase. However, the numerical ratio $X_2$ between these two increases differs from $X_1$. This means that the effects of the two dopings on the refractive-index and expansion-coefficient parameters are not able to simultaneously cancel each other out for both parameters, even though they run in opposite directions. Rather, their tendency to run in opposite directions acts to a different extent on the refractive index and on the linear thermal expansion coefficient and can only result in canceling the effect on one of the two parameters, while the other parameter remains unchanged by the double doping. Thus, for a multiplicity of linear thermal expansion coefficients, one and the same refractive index may be reached and vice versa.

For that reason, by properly selecting the concentrations of the fluorine doping and the germanium dioxide doping, within broad limits, any desired values may be implemented both for the refractive index as well as simultaneously for the linear thermal expansion coefficient.

In one preferred specific embodiment of the present invention, the fused silica of the core of the optical waveguide is undoped, and the fused silica of the cladding is doped both with the foreign substances fluorine (F) and germanium dioxide ($GeO_2$).

To illustrate one preferred specific embodiment of the present invention, FIG. 1 shows a cross-sectional representation of an enlarged section of a single-mode optical waveguide 1 in accordance with the present invention.

Optical waveguide 1 includes a doped fused-silica cladding 2 and an undoped fused-silica core 4. Cladding 2 and core 4 border on one another in a boundary region 3.

Due to the material properties of pure fused silica, the expansion coefficient of core 4 is approximately 5 . . . $6*10^{-7}$/° C. In accordance with one preferred specific embodiment of the present invention, the cladding is doped with two foreign substances, namely with fluorine (F) and germanium dioxide ($GeO_2$).

The doping of cladding 2 with fluorine is selected in such a way that the refractive index of the cladding material compared to fused silica is reduced by 0.6% by the fluorine doping alone. As the result of such a doping, the expansion coefficient of the cladding material drops to $2*10^{-7}$/° C., as can be inferred from the publication "Möglichkeiten und Grenzen des PCVD-Verfahrens zur Herstellung von Lichtleitfasern [Possibilities and Limits of the PCVD Method for Manufacturing Optical Waveguides] (final report), Delivery Plans of the BMFT, reference 412-7491-TK0255/9, report time period 1/84–12/86, by H. Lydtin et al.

The additional doping with germanium dioxide ($GeO_2$) is selected to be of such a concentration that an increase in the refractive index by 0.2% is effected, so that the refractive index of the cladding material is altogether 0.4% less than that of the core material. This is required of many single-mode fiber applications and represents a standard value for many commercial single-mode optical waveguides.

However, this additional doping causes the expansion coefficient of the cladding material to increase to the value for pure fused silica and, thus, again to the value of the core material (these data were also taken from the above-mentioned publication by H. Lydtin et al.).

In this case, no mechanical stresses arise during the cooling operation associated with the manufacture of optical waveguide 1. Thus, the overall mechanical stresses arising inside optical waveguide 1 during manufacturing are reduced in accordance with the present invention.

Therefore, one preferred specific embodiment of the present invention achieves a type of optical waveguide which has the same difference in the refractive index as conventional single-mode fibers and the same expansion coefficients of the core and cladding material.

In another specific embodiment of the present invention, by applying appropriate concentrations of the two mentioned dopants, fluorine and germanium dioxide, the linear thermal expansion coefficient of the cladding is selected to deviate from that of the core by such an amount that the total internal mechanical stress, which is derived as a sum from the interaction of all individual effects producing a stress inside the optical waveguide—in particular a cooling and drawing process during manufacturing—is canceled or minimized.

Industrial Applicability:

The present invention has industrial applicability, particularly in the area of signal and information transmission via optical waveguides used, for example, in optical transmission networks or undersea cables.

REFERENCE SYMBOL LIST 1 optical waveguide
2 cladding
3 boundary region between cladding and core
4 core

What is claimed is:

1. An optical waveguide having a core material and a cladding material, each of fused silica,
   wherein the difference between respective linear thermal expansion coefficients of the core material and the cladding material is selected by doping at least one of the core material and the cladding material using at least one foreign substance so that inner mechanical stresses produced in the optical waveguide by manufacturing process are reduced,
   wherein at least one of the core material and the cladding material is doped using at least one of a first foreign substance and a second foreign substance in such a way that a first ratio of chance in refractive index to change in linear thermal expansion coefficient produced by a doping using the first foreign substance is different from a second ratio of change in refractive index to chance in linear thermal expansion coefficient produced by a doping using the second foreign substance,
   wherein fluorine and $GeO_2$ are used as dopants for the cladding material in such concentrations that for a purpose of achieving a difference in the refractive index between the core material and the cladding material of 0.4%, given the same linear thermal expansion coefficients of the core material and the cladding material, the refractive index of the cladding material as compared to pure fused silica is reduced by 0.6% by the fluorine doping alone, and increased by the additional doping with germanium dioxide ($GeO_{b\,2}$) by 0.2%, so that the refractive index of the cladding material is less by altogether 0.4% than that of the core material.

2. A method for manufacturing an optical waveguide having a core material and a cladding material, each of fused silica, where a fiber is cooled and drawn from a melt, wherein the difference between linear thermal expansion coefficients of the core material and the cladding material is selected by doping at least one of the core material and the cladding material using at least one foreign substance to the effect that the inner mechanical stresses produced in the optical waveguide by at least one of a cooling, a drawing process and other mechanical stresses produced by the manufacturing process are reduced, wherein the difference between the linear thermal expansion coefficients of the core material and the cladding material is selected by suitably doping at least one of the core material and the cladding material in such a way that the inner mechanical stresses caused during the manufacturing process by the cooling counteract those stresses created by the drawing process, so that a sum of the internal mechanical stress is reduced.

3. The method for manufacturing an optical waveguide as recited in claim 2, wherein the doping is selected in such a way that the inner mechanical stresses caused by the cooling during the manufacturing process cancel those stresses caused by the drawing process.

4. A method for manufacturing an optical waveguide having a core material and a cladding material, each of fused silica, where a fiber is cooled and drawn from a melt, wherein a difference between respective linear thermal expansion coefficients of the core material and the cladding material is selected by doping at least one of the core material and the cladding material using at least one foreign substance to the effect that the inner mechanical stresses produced in the optical waveguide by at least one of a cooling, a drawing process and other mechanical stresses produced by the manufacturing process are reduced, wherein at least one of the core material and the cladding material is doped using at least one first and one second foreign substance in such a way that a first ratio of change in a first refractive index to a change in a first linear thermal expansion coefficient produced by a first doping using the first foreign substance is different from a second ratio of change in a second refractive index to a change in a second linear thermal expansion coefficient produced by a second doping using the second foreign substance, wherein fluorine and $GeO_2$ are used as dopants for the cladding material in such concentrations that for the purpose of achieving a difference in the refractive index between the core material and the cladding material of 0.4%, given the same linear thermal expansion coefficients of the core material and the cladding material, the refractive index of the cladding material as compared to pure fused silica is reduced by 0.6% by the fluorine doping alone, and increased by the additional doping with germanium dioxide ($GeO_2$) by 0.2%, so that the refractive index of the cladding material is altogether less by 0.4% than that of the core material.

* * * * *